United States Patent
Watanabe et al.

(10) Patent No.: US 7,994,923 B2
(45) Date of Patent: Aug. 9, 2011

(54) NON-CONTACT ELECTRONIC DEVICE

(75) Inventors: Kazuki Watanabe, Hino (JP); Takanori Yamazoe, Hadano (JP)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 12/053,269

(22) Filed: Mar. 21, 2008

(65) Prior Publication Data

US 2009/0267736 A1 Oct. 29, 2009

(30) Foreign Application Priority Data

Jun. 27, 2007 (JP) ............................. JP2007-169418

(51) Int. Cl.
G08B 13/14 (2006.01)
(52) U.S. Cl. .................. 340/572.7; 340/10.1; 340/10.2; 340/10.3; 340/10.4; 340/10.5; 340/10.6; 340/572.1; 340/572.2; 340/572.3; 340/572.4; 340/572.5; 340/572.6; 340/572.8; 340/572.9; 455/13.3; 455/41.1; 455/41.2; 455/66.1
(58) Field of Classification Search ........ 340/10.1–10.6, 340/572.1–572.9; 455/13.3, 41.1, 41.2, 66.1
See application file for complete search history.

(56) References Cited

U.S. PATENT DOCUMENTS

| | | | | |
|---|---|---|---|---|
| 2003/0104848 A1* | 6/2003 | Brideglall | ...................... | 455/574 |
| 2005/0186904 A1* | 8/2005 | Kowalski et al. | ............ | 455/41.1 |
| 2005/0212674 A1* | 9/2005 | Desmons et al. | .......... | 340/572.7 |
| 2007/0229277 A1* | 10/2007 | Usami | ........................ | 340/572.7 |
| 2008/0068132 A1* | 3/2008 | Kayanakis et al. | .......... | 340/10.1 |

FOREIGN PATENT DOCUMENTS

| | | |
|---|---|---|
| JP | 2005-173790 A | 6/2005 |
| KR | 2007-0056312 A | 4/2007 |
| WO | WO 2006/011000 A1 | 10/2006 |

OTHER PUBLICATIONS

"Information technology—Radio frequency identification for item management", ISO/IEC 18000-6, 2006.
"Identification cards—Contactless integrated circuit(s) cards—Vicinity cards", ISO/IEC 15693, 2000.

* cited by examiner

*Primary Examiner* — George A Bugg
*Assistant Examiner* — Ojiako Nwugo
(74) *Attorney, Agent, or Firm* — Miles & Stockbridge P.C.

(57) ABSTRACT

A contactless electronic device comprises a semiconductor integrated circuit device, a plurality of antennas (or antenna coils) for receiving high-frequency signals supplied by radio waves or electromagnetic waves having different frequencies. An interface judgment circuit judges which antenna the high-frequency signals are inputted through, and according to a result of the judgment, the operation of the semiconductor integrated circuit device is changed. In this manner, the contactless electronic device becomes possible to respond to a plurality of communication protocols using high-frequency signals having different frequencies, while contactless electronic devices have been impossible to respond to communication protocols using various high-frequency signals.

5 Claims, 9 Drawing Sheets

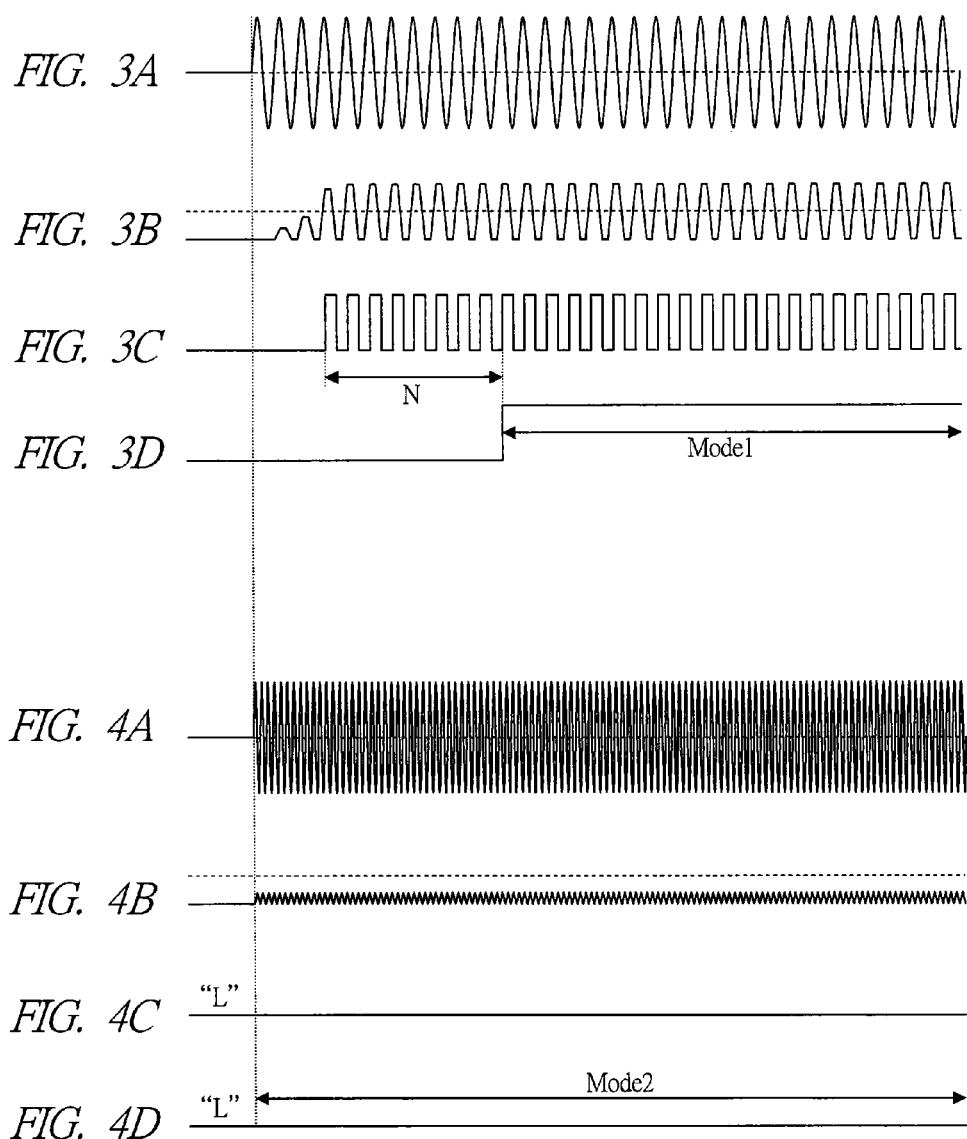

≒0V

≒0V
FIG. 8H "L" 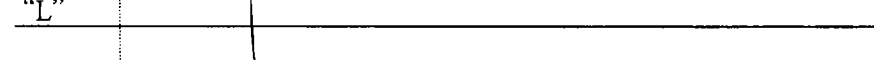
FIG. 8I "L" 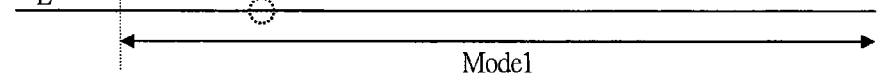
Mode1

FIG. 9I
Mode2

NON-CONTACT ELECTRONIC DEVICE

CROSS-REFERENCE TO RELATED APPLICATION

The present application claims priority from Japanese Patent Application No. JP 2007-169418 filed on Jun. 27, 2007, the content of which is hereby incorporated by reference into this application.

TECHNICAL FIELD OF THE INVENTION

The present invention relates to a technique for a contactless electronic device. More particularly, the present invention relates to a technique effectively applied to a semiconductor integrated circuit device included in an IC tag.

BACKGROUND OF THE INVENTION

So-called IC tag, which is a contactless electronic device mounting a semiconductor integrated circuit device and an antenna inside, performs information exchanges between a reader/writer device and the semiconductor integrated circuit device, and it realizes various functions such as data transfer of data retained by the IC tag and data retention of data transmitted from the reader/writer device. More particularly, the semiconductor integrated circuit device mounted in the IC tag receives carrier signals supplied from the reader/writer device by the antenna, and rectifies and smoothes an voltage generated between both ends of the antenna, so that an internal voltage required for operating internal circuits is formed, and the semiconductor integrated circuit device superimposes data to the carrier signal supplied from the reader/writer device as well, thereby performing data exchanges.

As for such an IC tag, Japanese Patent Application Laid-Open Publication No. 2005-173790 (Patent Document 1) discloses a technique for essentially eliminating frequency restrictions of the carrier radio waves by generating internal clocks inside the IC tag. In addition, ISO/IEC 18000-6 (Non-Patent Document 1) and ISO/IEC 15693 (Non-Patent Document 2) list various basic specifications of IC tags as standards.

SUMMARY OF THE INVENTION

Communications between a reader/writer device and an IC tag often use, as described in Non-Patent Document 1 and Non-Patent Document 2, high-frequency signals of a bandwidth of 860 MHz to 960 MHz what is called UHF band, and a high-frequency signal of 13.56 MHz band as carrier signals for the communication, and there are various communication protocols defining data exchange. Further, a carrier signal of 2.45 GHz band is also used.

The communication means described in Non-Patent Document 1 use high-frequency signals of the bandwidth of 860 MHz to 960 MHz, so-called UHF band, as the carrier signal. The downstream communication is made by a system which partly modulates the amplitude of carrier signal by downstream communication data, what is called amplitude modulation, and the downstream communication data is encoded by the Miller encoding using a subcarrier and the like. And, the data rate is determined corresponding to the communication speed designated by the reader/writer device, independently of the carrier signals of UHF band.

The communication means described in Non-Patent Document 2 use the high-frequency signal of 13.56 MHz band as the carrier signal. The downstream communication is made by a system which partly modulates the amplitude of the carrier signal, what is called amplitude modulation, and the downstream communication data is encoded by the Manchester encoding using the Manchester code, subcarrier, and the like. And, the data rate is provided according to frequencies obtained by frequency dividing on the carrier signal of 13.56 MHz.

As the communication means in Non-Patent Document 1 and Non-Patent Document 2, generally, a majority of the IC tags correspond to one bandwidth each, and the frequency of carrier signal and the communication protocol are selected depending on the usage pattern and so on.

For example, the IC tag using high-frequency signals of UHF band as in Non-Patent Document 1 is suitable to a usage pattern requiring long-distance communications such as the case where a product manager manages IC tags attached to a great number of products in a lump. However, in the case where different users use a same IC tag, even if the usage pattern does not require long-distance communications, it has been required to use signals of UHF band. Therefore, for example, a circuit for driving the antenna in the reader/writer device has required high-performance parts capable of operation in UHF band, and thus it has been difficult to provide inexpensive reader/writer devices.

And, the IC tag using the high-frequency signal of 13.56 MHz band as in Non-Patent Document 2 is, while component parts of the reader/writer are inexpensive as compared to the one using UHF band, the communication distance between the IC tag and the reader/writer is short, and thus it is a disadvantage for the usage pattern requiring long-distance communications such as the case where a product manager manages IC tags attached to a great number of products in a lump.

As described above, in the case where an IC tag corresponding to a single bandwidth is used, in view of advantages what respective carrier signals and communication protocols have, it has been required to select a suitable carrier signal and a suitable communication protocol according to the usage pattern of the IC tag. Therefore, since it has been difficult to use a plurality of carrier frequencies to a same IC tag, it has been impossible to use the advantages what the respective carrier frequencies and communication protocols have in combination.

On the other hand, as an IC tag which corresponds to various carrier signals, there is disclosed an IC tag in Patent Document 1. The IC tag disclosed in Patent Document 1 eliminates restrictions on frequencies of carrier signals by mounting an oscillator on an IC chip, so that a method of reading and a method of writing of data stored in the IC tag are realized.

By using the means of Patent Document 1, since it is not required to perform communications synchronized with carrier signals unlike Non-Patent Document 2, the carrier signals are used for only generation of an internal voltage and data transfer to the reader/writer device. Accordingly, it is predicted to reduce restrictions on frequencies of carrier signals and improve the freedom of selection. However, since the data transfer from the reader/writer device to the IC tag uses optical signals, it has been very difficult to apply the IC tag of Patent Document 1 to the IC tags of Non-Patent Document 1 and Non-Patent Document 2 and the like which realize communications with IC tags by using only radio waves and electromagnetic waves.

Accordingly, an object of the present invention is to provide a contactless electronic device (IC tag) which is compatible to a plurality of communication protocols using high-frequency signals having different frequencies. The above and other objects and novel characteristics of the present invention will be apparent from the description of this specification and the accompanying drawings.

The typical ones of the inventions disclosed in this application will be briefly described as follows.

A contactless electronic device of the present invention comprises: a plurality of antennas for receiving high-frequency signals supplied by radio waves and electromagnetic waves having different frequencies; and a semiconductor integrated circuit device which processes data transferred and received by using the plurality of antennas. And, the semiconductor integrated circuit device includes an input/output judgment circuit for judging which antenna the high-frequency signals are inputted through, thereby changing an operational state inside the semiconductor integrated circuit device itself according to a result of the judgment. In this manner, upon receiving high-frequency signals from a reader/writer device, for example, by way of selecting a processing content corresponding to a bandwidth of the high-frequency signal, it is enabled, for example, to respond to the reader/writer device by a communication protocol compliant to the bandwidth.

The effects obtained by typical aspects of the present invention will be briefly described below. Particularly, a contactless electronic device is enabled to respond to a plurality of communication protocols using high-frequency signals having different frequencies.

BRIEF DESCRIPTIONS OF THE DRAWINGS

FIG. 3A is an example of an operational waveform of a part in the contactless electronic device shown in FIG. 1;

FIG. 3B is an example of an operational waveform of a part in the contactless electronic device shown in FIG. 1;

FIG. 3C is an example of an operational waveform of a part in the contactless electronic device shown in FIG. 1;

FIG. 3D is an example of an operational waveform of a part in the contactless electronic device shown in FIG. 1;

FIG. 4A is an example of an operational waveform of a part in the contactless electronic device shown in FIG. 1;

FIG. 4B is an example of an operational waveform of a part in the contactless electronic device shown in FIG. 1;

FIG. 4C is an example of an operational waveform of a part in the contactless electronic device shown in FIG. 1;

FIG. 4D is an example of an operational waveform of a part in the contactless electronic device shown in FIG. 1;

FIG. 8H is an example of an operational waveform of a part in the contactless electronic device shown in FIG. 6;

FIG. 8I is an example of an operational waveform of a part in the contactless electronic device shown in FIG. 6;

FIG. 9A is an example of an operational waveform of a part in the contactless electronic device shown in FIG. 6;

FIG. 9B is an example of an operational waveform of a part in the contactless electronic device shown in FIG. 6;

FIG. 9C is an example of an operational waveform of a part in the contactless electronic device shown in FIG. 6;

FIG. 9D is an example of an operational waveform of a part in the contactless electronic device shown in FIG. 6;

FIG. 9E is an example of an operational waveform of a part in the contactless electronic device shown in FIG. 6;

FIG. 9F is an example of an operational waveform of a part in the contactless electronic device shown in FIG. 6;

FIG. 9G is an example of an operational waveform of a part in the contactless electronic device shown in FIG. 6;

FIG. 9H is an example of an operational waveform of a part in the contactless electronic device shown in FIG. 6;

FIG. 9I is an example of an operational waveform of a part in the contactless electronic device shown in FIG. 6.

DESCRIPTIONS OF THE PREFERRED EMBODIMENTS

In the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
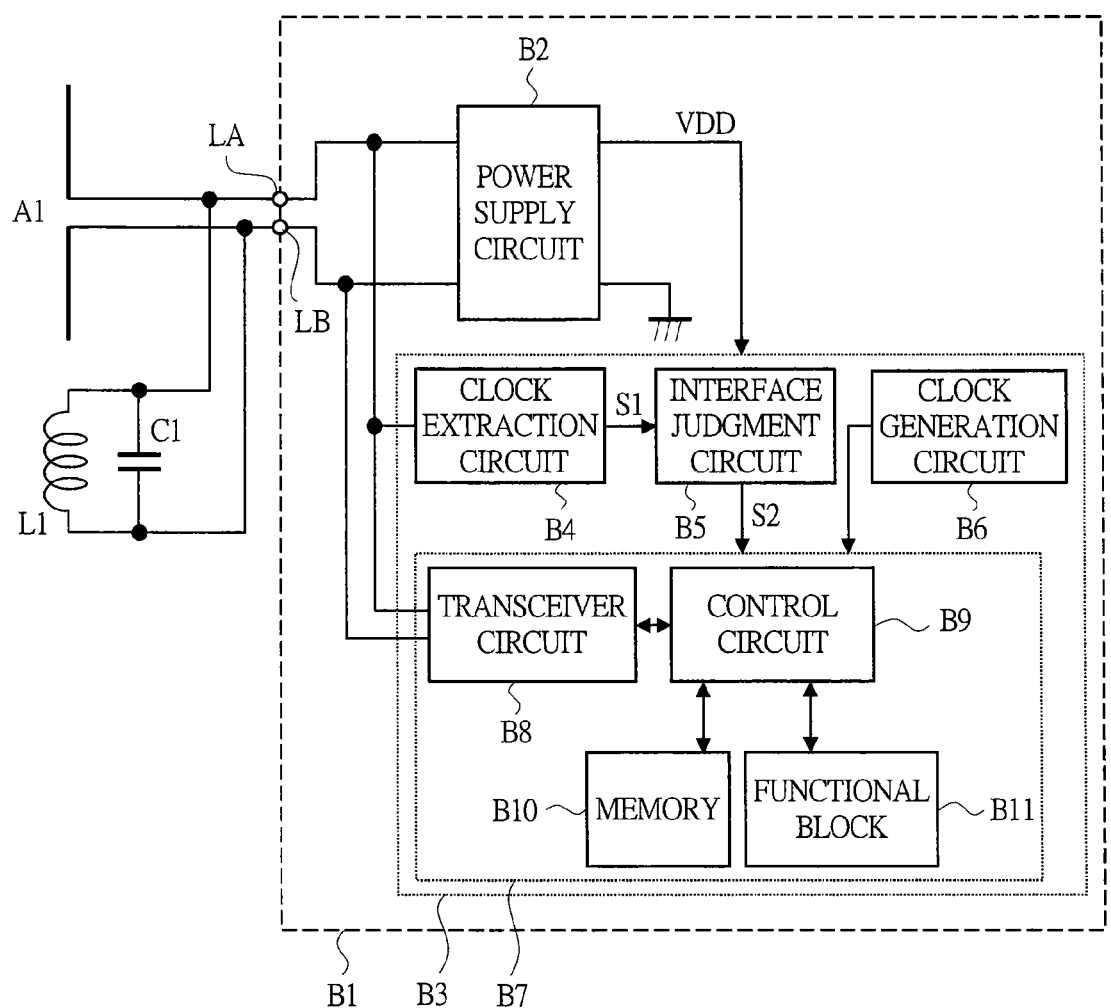
FIG. 1 is a contactless electronic device according to a first embodiment of the present invention.

FIG. 1 shows a basic configuration of a contactless electronic device according to a first embodiment of the present invention. In FIG. 1, B1 is a semiconductor integrated circuit device to be mounted in the contactless electronic device, A1 and L1 are an antenna and an antenna coil to be mounted in the contactless electronic device, and C1 is a resonance capacitor. The semiconductor integrated circuit device B1 has: a power supply circuit B2; an internal circuit B3; and antenna terminals LA and LB for connecting the antenna A1 and the antenna coil L1. Further, in FIG. 1, while the resonance capacitor C1 is mounted in the contactless electronic device, the resonance capacitor C1 may be mounted in the semiconductor integrated circuit device B1.

The antenna A1 and the antenna coil L1 receive high-frequency signals supplied from a reader/writer device and supply high-frequency alternate-current (AC) signals to the antenna terminals LA and LB. The AC signals are partly modulated by information signals (data). Typically, the antenna A1 is an antenna capable of receiving high-frequency signals of UHF band and 2.45 GHz band, to which high-frequency signals are supplied in a form of radio waves from the reader/writer device. And, typically, the antenna coil L1 is an antenna coil capable of receiving high-frequency signals of 13.56 MHz band, to which high-frequency signals are supplied in a form of electromagnetic waves from the reader/writer device.

The power supply circuit B2 comprises, although not illustrated, a rectification circuit and a smoothing capacitor generally used. The rectification circuit rectifies the AC signal received by the antenna A1 and the antenna coil L1 provided to the contactless electronic device, and the smoothing capacitor smoothes an output signal of the rectifier circuit, thereby obtaining a supply voltage VDD to be supplied to the internal circuit B3. Further, a regulator circuit for controlling the supply voltage not to exceed a predetermined voltage may be provided.

The internal circuit B3 comprises: a clock extraction circuit B4; an interface judgment circuit B5; a clock generation circuit B6; and a signal processing circuit B7. The clock extraction circuit B4 binarizes the high-frequency signal received by the antenna coil L1, so that a clock signal having a same cycle as that of the high-frequency signal is generated, and outputs it as an output signal S1.

The interface judgment circuit B5 receives the output signal S1 of the clock extraction circuit B4 and judges which of the antenna A1 and the antenna coil L1 receives the high-frequency signal supplied from the reader/writer device, and supplies a result of the judgment as an output signal S2 to the signal processing circuit B7. The clock generation circuit B6 is a circuit which generates a clock signal for operating the signal processing circuit B7 by obtaining the supply voltage VDD supplied thereto, and it generally comprises an oscillation circuit and the like.

The signal processing circuit B7 comprises: a transceiver circuit B8; a control circuit B9; a memory B10; and a functional block B11. The transceiver circuit B8 has: a function of demodulating an information signal to be superimposed to the AC signal being received by the antenna A1 and the antenna coil L1 provided to the contactless electronic device and supplying the same as a digital information signal to the control circuit B9; and a function of receiving the information signal of the digital signal outputted from the control circuit B9 and demodulating the AC signal being received by the antenna A1 and the antenna coil L1 by the same information signal. The reader/writer device receives the information signal from the control circuit B9 corresponding to changes of reflections of radio waves and electromagnetic waves from the antenna A1 and the antenna coil L1 by the above modulating operation.

The memory B10 is used for, for example, storing information data between the control circuit B9, and the control circuit B9 performs reading, writing, and deleting of data.

The functional block 11 has, although not particularly limited to this, a specific calculation function such as data encryption function, and the control circuit B9 controls the operation of the functional block 11. Meanwhile, the functional block 11 may not be mounted.

The signal processing circuit B7 changes operational states of its own according to the output signal S2 of the interface judgment circuit B5. For example, in the case where the high-frequency signal supplied from the reader/writer device is received by the antenna A1, the signal processing circuit B7 allows the functional block 11 to operate, and in the case where the high-frequency signal supplied from the reader/writer device is received by the antenna coil L1, the signal processing circuit B7 inhibits the functional block B11 to operate. Further, in the case where the high-frequency signal supplied from the reader/writer device is received by the antenna A1, the data writing function to the memory B10 may be invalidated, and in the case where the high-frequency signals supplied from the reader/writer device is received by the antenna coil L1, the data writing function to the memory B10 may be validated.

Figure 2:
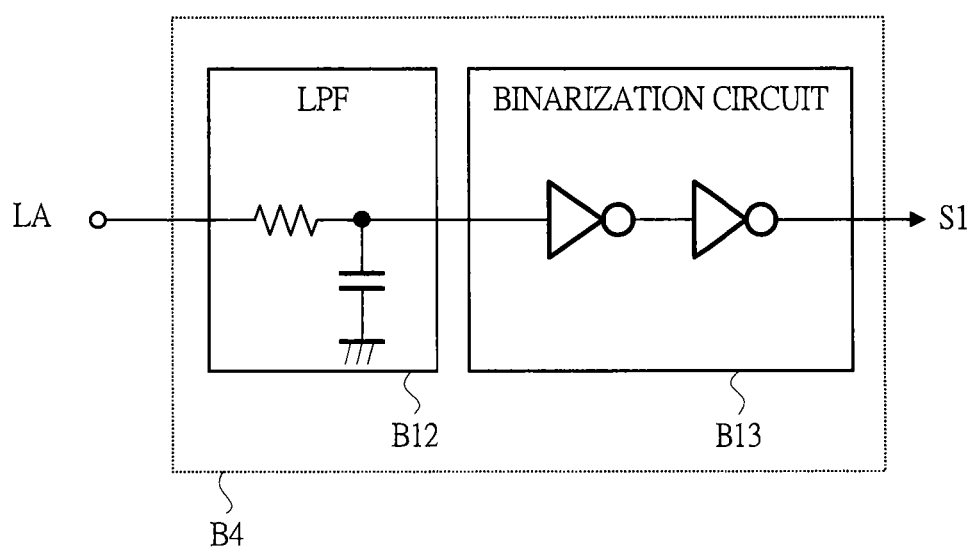
FIG. 2 is a concrete embodiment of a clock extraction circuit to be mounted in a contactless electronic device according to the present invention.

FIG. 2 shows a basic circuit configuration of the clock extraction circuit B4 to be mounted in the contactless electronic device according to the present invention. Each of FIG. 3A to FIG. 4D shows an example of a waveform of each part of the contactless electronic device shown in FIG. 1.

Each of FIG. 3A to FIG. 3D shows an example of an operational waveform in the case where the high-frequency signal supplied from the reader/writer device is received by the antenna coil L1. FIG. 3A shows a high-frequency signal generated between the antenna terminals, FIG. 3B shows an output signal of a filter circuit B12 provided to the clock extraction circuit B4, FIG. 3C shows the output signal S1 of the clock extraction circuit B4, and FIG. 3D shows the output signal S2 of the interface judgment circuit B5, respectively.

Each of FIG. 4A to FIG. 4D shows an example of an operational waveform in the case where the high-frequency signal supplied from the reader/writer device is received by the antenna A1. FIG. 4A shows a high-frequency signal generated between the antenna terminals, FIG. 4B shows an output signal of the filter circuit B12 provided to the clock extraction circuit B4, FIG. 4C shows the output signal S1 of the clock extraction circuit B4, and FIG. 4D shows the output signal S2 of the interface judgment circuit B5, respectively.

The clock extraction circuit B4 shown in FIG. 2 comprises the filter circuit B12 and a binarization circuit B13. The filter circuit B12 removes unnecessary frequency components from the high-frequency signal supplied between the antenna terminals by the antenna A1 and the antenna coil L1, and the binarization circuit B13 binarizes the high-frequency signal. While the filter circuit B12 typically comprises a low-pass filter, a band-pass filter may be also used. Note that, frequency characteristics of the filter circuit B12 is set to remove only one of the high-frequency signal received by the antenna A1 and the high-frequency signal received by the antenna coil L1.

In addition, as described above, the antenna A1 is an antenna which receives the high-frequency signal of 2.45 GHz band, and the antenna coil L1 is an antenna coil which receives the high-frequency signal of 13.56 MHz. Therefore, in consideration of a consumption current of the clock extraction circuit B4, it is preferred to set the frequency characteristics so that the filter circuit B12 allows the high-frequency signal received by the antenna coil L1 to pass and eliminates the high-frequency signal received by the antenna A1.

The binarization circuit B13 compares the output signal of the filter circuit B12 with a predetermined voltage and outputs "0" or "1" according to the magnitude relation thereof. In this manner, the binarization circuit B13 binarizes the high-frequency signals passed through the filter circuit B12 and supplies the extracted clock signal to the interface judgment circuit B5.

In the case where the high-frequency signal supplied from the reader/writer device is received by the antenna coil L1, as shown in FIG. 3A to FIG. 3D, the high-frequency signal generated between the antenna terminals passes through the filter circuit B12, thereby obtaining a clock signal as the output signal of the binarization circuit B13, which is the output signal S1 of the clock extraction circuit B4. The interface judgment circuit B5 receives the output signal S1 of the clock extraction circuit B4 and detects the output signal S1 as clock signal, thereby judging that the high-frequency signal is supplied from the antenna coil L1 (Mode1).

At this time, in view of influences of noise and the like, the interface judgment circuit B5 is preferred to count how many cycles of the clock signal have been inputted and to judge that the high-frequency signal is supplied from the antenna coil L1 when the number of cycles exceeds a predetermined number N. FIGS. 3A to 3D show the case where clocks of 8 cycles are counted for the judgment.

On the other hand, in the case where the high-frequency signal supplied from the reader/writer device is received by the antenna A1, as shown in FIGS. 4A to 4D, the high-frequency signal generated between the antenna terminals is removed by the filter circuit B12, and the filter circuit B12 outputs an output signal having a potential close to the ground voltage. In this manner, since the output signal S1 of the binarization circuit B13 cannot obtain clock signals, the interface judgment circuit B5 outputs the output signal S2 having an initial value. Herein, in the case where the output signal S2 has an initial value, it is considered that the interface judgment circuit B5 has judged that the high-frequency signal is supplied from the antenna A1 (Mode2).

According to the configuration and operations described above, in the case where two antennas are connected to same terminals, it becomes possible to specify the antenna receiving the high-frequency signal. In this manner, by utilizing the output signal of the interface judgment circuit B5, it becomes possible to realize a function of controlling the availability of operation of the functional block B11 provided to the signal processing circuit B7 according to the bandwidth of the receiving high-frequency signal, and an access limitation to the memory B10, etc.

Second Embodiment

Figure 5:
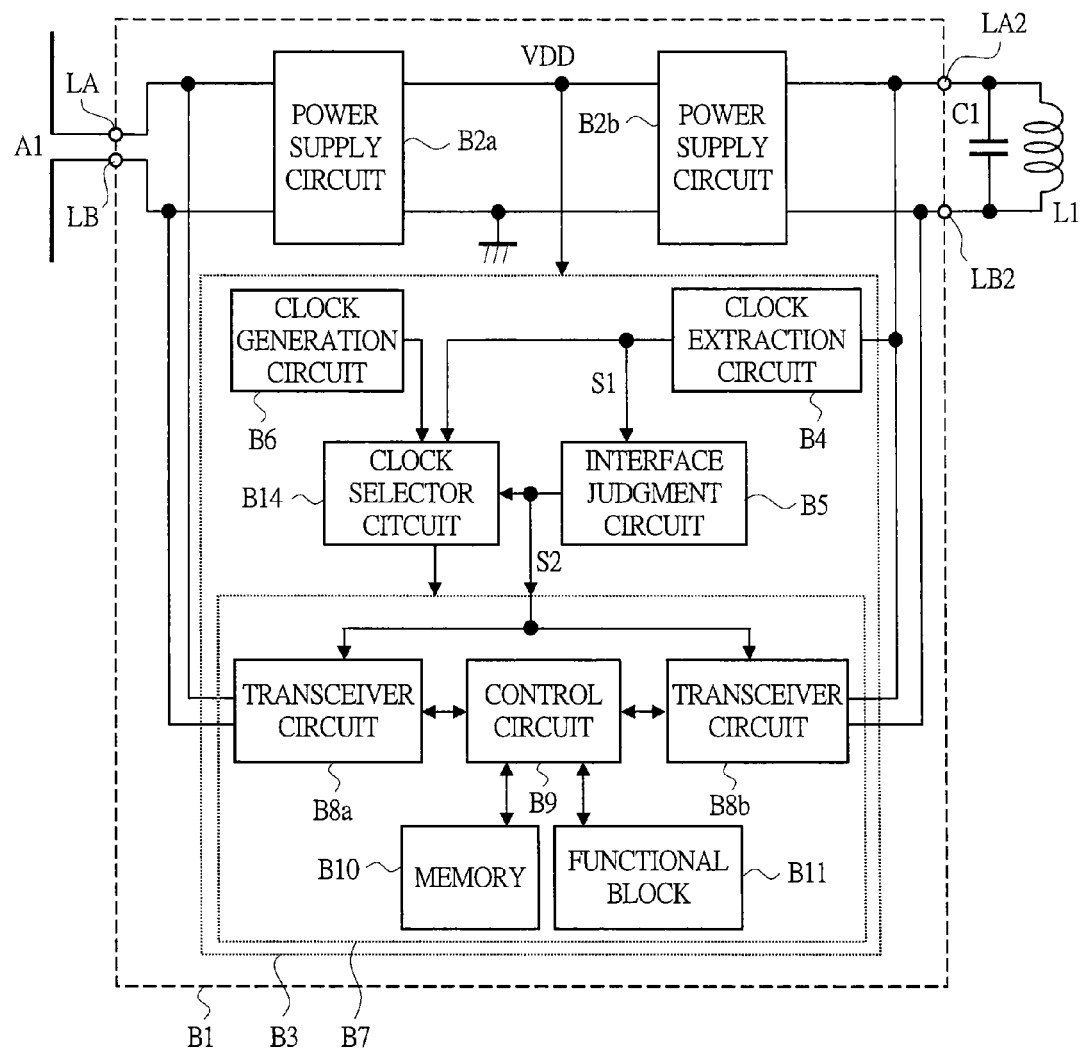
FIG. 5 is a contactless electronic device according to a second embodiment of the present invention.

FIG. 5 shows a basic configuration of a contactless electronic device according to a second embodiment of the present invention. The second embodiment shown in FIG. 5 is a modification of the first embodiment, in which the terminals connecting antenna A1 and the antenna coil L1 are separated, and further, a function of selecting a clock signal to be used for operating the signal processing circuit B7 and a selecting function of the transceiver circuits are added.

In FIG. 5, B1 is the semiconductor integrated circuit device, A1 and L1 are the antenna and the antenna coil to be mounted in the contactless electronic device, C1 is the resonance capacitor. The semiconductor integrated circuit device B1 has: power supply circuits B2a and B2b, the internal circuit B3, antenna terminals LA and LB for connecting the antenna A1, and antenna terminals LA2 and LB2 for connecting the antenna coil L1. In FIG. 5, while two sets of antenna terminals, for example, in the case where the antenna terminals LB and LB2 are used for the ground potential in the semiconductor integrated circuit device B1, it is possible to remove the antenna terminal LB2 and connect one terminal of the antenna coil L1 to the antenna terminal LB. Further, similarly to the first embodiment, the resonance capacitor C1 may be mounted in the semiconductor integrated circuit device B1.

The antenna A1 receives the high-frequency signal supplied from the reader/writer device and supplies an AC signal having a high frequency to the antenna terminals LA and LB. The antenna coil L1 receives the high-frequency signal supplied from the reader/writer device and supplies an AC signal having a high frequency to the antenna terminals LA2 and LB2. The AC signal is partially modulated by an information signal (data). Typically, the antenna A1 is an antenna which is capable of receiving the high-frequency signals of UHF band and 2.45 GHz band to which a high-frequency signal is supplied in a form of radio waves from the reader/writer device. The antenna coil L1 is an antenna coil which is capable of receiving the high-frequency signal of 13.56 MHz band to which a high-frequency signal supplied in a form of electromagnetic waves from the reader/writer device. Further, since the connection terminals of the antenna A1 and the antenna coil L1 are separated, the power supply circuits B2a and B2b are provided to respective antenna connection terminals. At this time, output voltages from the two power supply circuits B2a and B2b are supplied to the internal circuit B3 as the supply voltage VDD.

The power supply circuits B2a and B2b comprise such as, although not shown, a rectification circuit and a smoothing capacitor generally used. The rectification circuit rectifies the AC signals received by the antenna A1 and the antenna coil L1 provided to the contactless electronic device, and the smoothing circuit smoothes an output signal of the rectification circuit, thereby obtaining the supply voltage VDD to be supplied to the internal circuit B3. Further, the smoothing capacitor comprised in the power supply circuits B2a and B2b may be shared, and a regulator circuit for controlling the supply voltage VDD not to exceed a predetermined voltage may be provided.

The internal circuit B3 comprises: the clock extraction circuit B4; the interface judgment circuit B5; the clock generation circuit B6; the signal processing circuit B7; and a clock selector circuit B14. The clock extraction circuit B4 binarizes the high-frequency signal received by the antenna coil L1, so that a clock signal having a same cycle as the high-frequency signal is generated, and outputs it as the output signal S1.

The interface judgment circuit B5 receives the output signal S1 of the clock extraction circuit B4 and judges which of the antenna A1 and the antenna coil L1 receives the high-frequency signal supplied from the reader/writer device, and supplies a result of the judgment as the output signal S2 to the signal processing circuit B7 and the clock selector circuit B14.

In the case where the high-frequency signal supplied from the reader/writer device is received by the antenna A1, the clock selector circuit B14 supplies a clock signal outputted by the clock generation circuit B6 to the signal processing circuit B7, and in the case where the high-frequency signal supplied from the reader/writer device is received by the antenna coil L1, the clock selector circuit B14 supplies a clock signal having a same cycle as the high-frequency signal binarized by the clock extraction circuit B4 to the signal processing circuit B7. At this time, the clock selector circuit B14 may have a function of changing the frequency of the clock signal to be compatible to communication protocols and the like by not only selecting clock signals outputted by the clock extraction circuit B4 and the clock generation circuit B6, but also dividing the frequency of the clock signal.

The signal processing circuit B7 comprises: transceiver circuits B8a and B8b; the control circuit B9; the memory B10; and the functional block B11. The transceiver circuit B8a has: a function of demodulating an information signal to be superimposed to the AC signal received by the antenna A1 provided to the contactless electronic device and supplying the same as a digital information signal to the control circuit B9; and a function of receiving the information signal of digital signal outputted from the control circuit B9 and modulating the AC signal being received by the antenna A1 by the same information signal. The transceiver circuit B8b has: a function of demodulating an information signal to be superimposed to the AC signal received by the antenna coil L1 provided to the contactless electronic device and supplying the same as a digital information signal to the control circuit B9; and a function of receiving the information signal of digital signal outputted from the control circuit B9 and modulating the AC signal being received by the antenna coil L1 by the same information signal.

The memory B10 is used for, for example, storing information data between the control circuit B9, and the control circuit B9 performs reading, writing, and deleting of data. The functional block 11 has, although not limited to this, a specific calculation function such as data encryption function, and the control circuit B9 controls the operation of the functional block 11. Further, according to the output signal S2 of the interface judgment circuit B5, in the case where the high-frequency signal supplied from the reader/writer device is received by the antenna A1, the signal processing circuit B7 allows the transceiver circuit B8a to operate and makes the transceiver circuit B8b paused, and in the case where the high-frequency signal supplied from the reader/writer device is received by the antenna coil L1, the signal processing circuit B7 makes the transceiver circuit B8a paused and allows the transceiver circuit B8b to operate.

According to the configuration and operations described above, as well as it becomes possible to specify the antenna receiving the high-frequency signal, it becomes possible to select a clock signal compliant to the bandwidth of the receiving high-frequency signal, and a transceiver circuit. Accordingly, it becomes possible to realize stable data transmission/reception by supplying the output signal S1 of the clock extraction circuit B4 as the operational clock of the internal circuit B3 in the case where the high-frequency signal of 13.56 MHz is used for the carrier signals and the communication data rate depends on the frequency of the carrier signal as Non-Patent Document 2, and, it becomes possible to realize stable data transmission/reception by supplying the clock signal outputted by the clock generation circuit B6 as the operational clock of the internal circuit B3 in the case where high-frequency signals of UHF band are used for the carrier signal and the communication data rate does not depend on the frequency of the carrier signal as Non-Patent Document 1. In this manner, it is possible to select the most compatible clock signal to any communication protocols. And further, since it becomes possible for an unnecessary transceiver circuit to pause, power consumption can be reduced.

Third Embodiment

Figure 6:
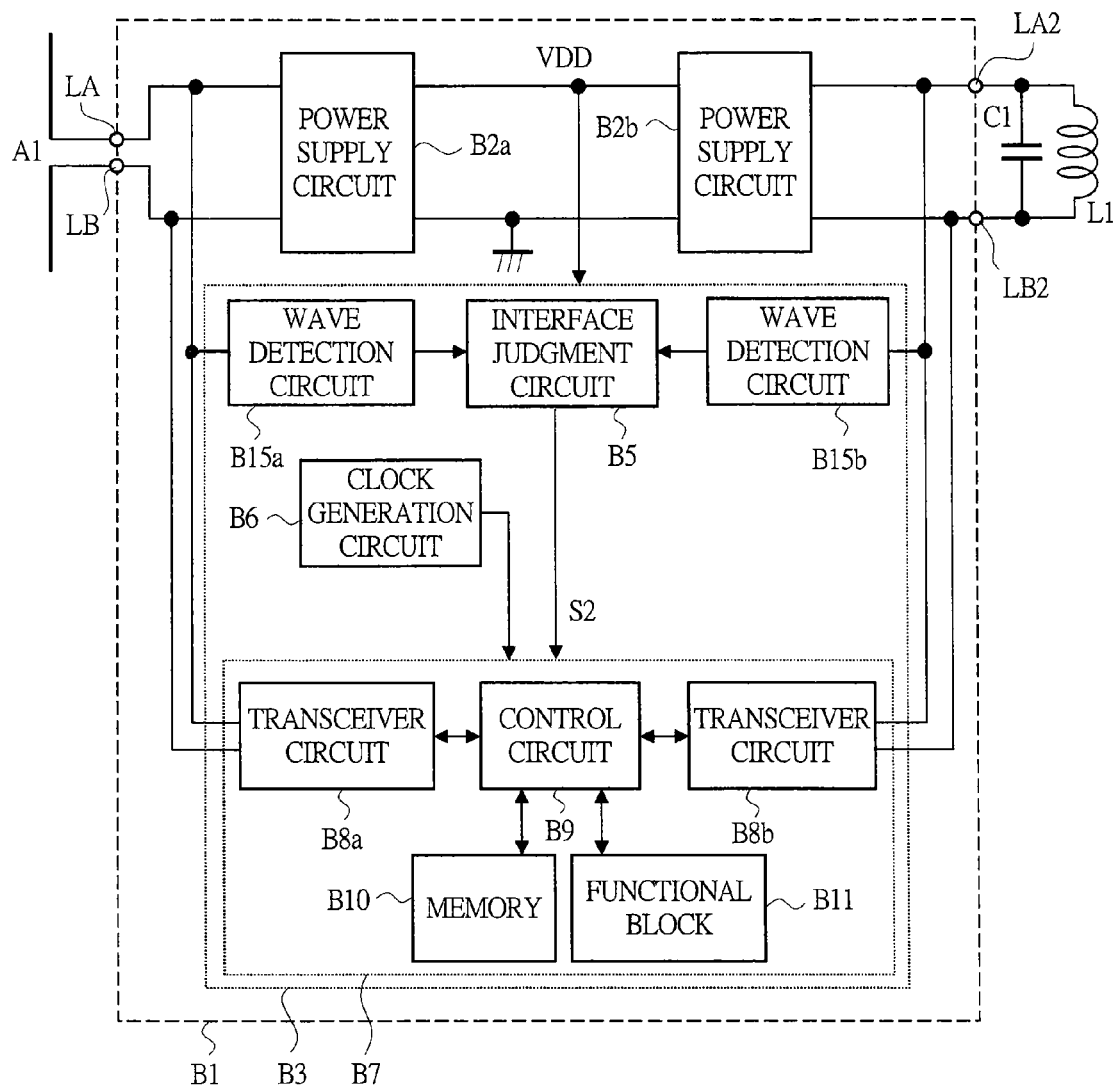
FIG. 6 is a contactless electronic device according to a third embodiment of the present invention.

FIG. 6 shows a basic configuration of a contactless electronic device according to a third embodiment of the present invention. The third embodiment shown in FIG. 6 has the terminals connecting the antenna A1 and the antenna coil L1 separated, and further, high-frequency signals generated between the antenna terminals are detected by a wave detection circuit.

In FIG. 6, B1 is the semiconductor integrated circuit device mounted in the contactless electronic device, A1 and L1 are the antenna and the antenna coil mounted in the contactless electronic device, and C1 is the resonance capacitor. The semiconductor integrated circuit device B1 comprises: the power supply circuits B2a and B2b, the internal circuit B3, the antenna terminals LA and LB for connecting the antenna A1, and the antenna terminals LA2 and LA3 for connecting the antenna coil L1. In FIG. 6, while two sets of antenna terminals are provided, for example, in the case where the antenna terminals LB and LB2 are used for the ground potential in the semiconductor integrated circuit device B1, the antenna terminal LB2 may be removed and one terminal of the antenna coil L1 may be connected to the antenna terminal LB. Further, similarly to the first embodiment, the resonance capacitor C1 may be mounted in the semiconductor integrated circuit device B1.

The antenna A1 receives the high-frequency signal supplied from the reader/writer device and supplies a high-frequency AC signal to the antenna terminals LA and LB. The antenna coil L1 receives the high-frequency signal supplied from the reader/writer device and supplies a high-frequency AC signal to the antenna terminals LA2 and LB2. The AC signal is partly modulated by an information signal (data). Typically, the antenna A1 is an antenna capable of receiving high-frequency signals of UHF band and 2.45 GHz band to which high-frequency signals are supplied in a form of radio waves from the reader/writer device. And, typically, the antenna coil L1 is an antenna coil capable of receiving the high-frequency signal of 13.56 MHz band, to which high-frequency signals are supplied in a form of electromagnetic waves from the reader/writer device. Further, since the connection terminals of the antenna A1 and the antenna coil L1 are separated, the power supply circuits B2 are provided to the respective antenna connection terminals. At this time, output voltages from the two power supply circuits are supplied to the internal circuit B3 as the supply voltage VDD.

The power supply circuits B2a and B2b comprise, although not illustrated, a rectification circuit and a smoothing capacitor generally used. The rectification circuit rectifies the AC signals received by the antenna A1 and the antenna coil L1 provided to the contactless electronic device, and the smoothing capacitor smoothes the output signal of the rectification circuit, thereby obtaining the supply voltage VDD to be supplied to the internal circuit B3. Further, the smoothing capacitors provided to the power supply circuits B2a and B2b may be shared, and a regulator circuit for controlling not to make the supply voltage VDD exceed a predetermined voltage may be provided.

The internal circuit B3 comprises: wave detection circuits B15a and B15b; the interface judgment circuit B5; the clock generation circuit B6; and the signal processing circuit B7. The wave detection circuit B15a binarizes the existence of the high-frequency signal received by the antenna A1 provided to the contactless electronic device, thereby detecting whether the high-frequency signal is supplied from the antenna A1. The wave detection circuit B15b binarizes the existence of the high-frequency signal received by the antenna coil L1 provided to the contactless electronic device, thereby detecting whether the high-frequency signal is supplied from the antenna coil L1.

The interface judgment circuit B5 receives an output signal S3 of the wave detection circuit B15a and an output signal S4 of the wave detection circuit B15b and judges which of the antenna A1 and the antenna coil L1 receives the high-frequency signal from the reader/writer device, and supplies a result of the judgment as an output signal S2 to the signal processing circuit B7.

The signal processing circuit B7 comprises: transceiver circuits B8a and B8b; the control circuit B9; the memory B10; and the functional block B11. The transceiver circuit B8a has: a function of demodulating an information signals to be superimposed to the AC signal received by the antenna A1 provided to the contactless electronic device and supplying the same as a digital information signal to the control circuit B9; and a function of receiving the information signal of digital signal outputted from the control circuit B9 and modulating the AC signal being received by the antenna A1 by the same information signal. The transceiver circuit B8b has: a function of demodulating an information signal to be superimposed to the AC signal received by the antenna coil L1 provided to the contactless electronic device and supplying the same as a digital information signal to the control circuit B9; and a function of receiving the information signal of digital signal outputted from the control circuit B9 and modulating the AC signal being received by the antenna coil L1 by the same information signal.

The memory B10 is used for, for example, storing information data between the control circuit B9, and the control circuit B9 performs reading, writing, and deleting of data. The functional block 11 has, although not limited to this, a specific calculation function such as data encryption function, and the control circuit B9 controls the operation of the functional block 11. Meanwhile, the functional block 11 may not be mounted.

The signal processing circuit B7 changes operational states of its own according to the output signal S2 of the interface judgment circuit B5. For example, in the case where the high-frequency signal supplied from the reader/writer device is received by the antenna A1, the signal processing circuit B7 allows the functional block 11 to operate, and in the case where the high-frequency signal supplied from the reader/writer device is received by the antenna coil L1, the signal processing circuit B7 inhibits the functional block B11 to operate. Further, in the case where the high-frequency signal supplied from the reader/writer device is received by the antenna A1, the data writing function to the memory B10 may be invalidated, and in the case where the high-frequency signal supplied from the reader/writer device is received by the antenna coil L1, the data writing function to the memory B10 may be validated.

Figure 7:
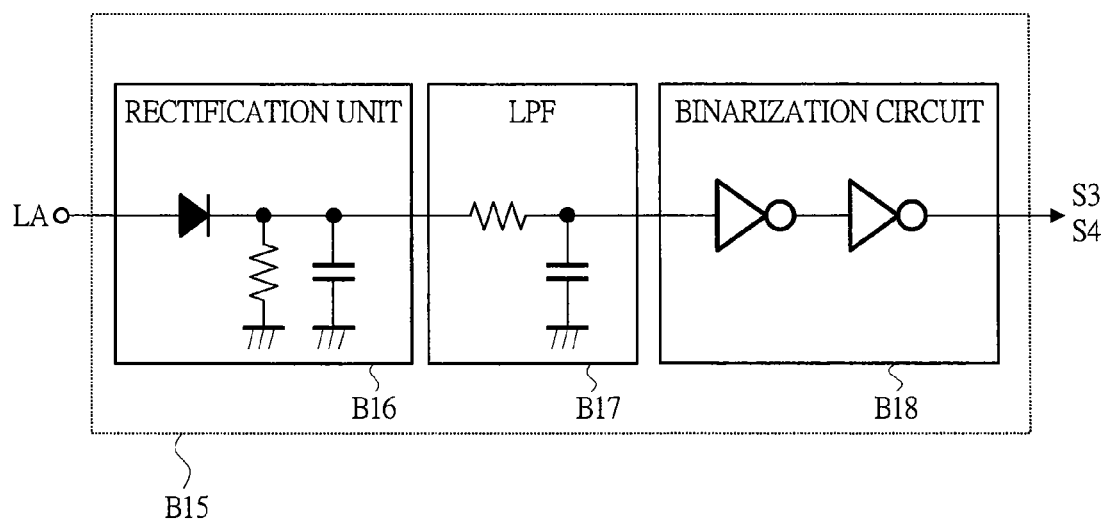
FIG. 7 is a concrete embodiment of a wave detection circuit to be mounted in a contactless electronic device according to the present invention.

FIG. 7 shows a basic circuit configuration of the wave detection circuit to be mounted in the contactless electronic device according to the present invention. Each of FIG. 8A to FIG. 9I shows an example of a waveform of each part of the contactless electronic device shown in FIG. 6.

Figure 8A:
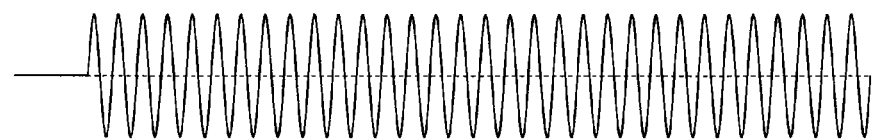
FIG. 8A is an example of an operational waveform of a part in the contactless electronic device shown in FIG. 6.
Figure 8B:
FIG. 8B is an example of an operational waveform of a part in the contactless electronic device shown in FIG. 6.
Figure 8C:
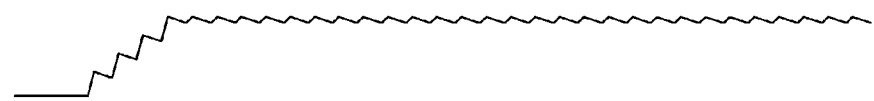
FIG. 8C is an example of an operational waveform of a part in the contactless electronic device shown in FIG. 6.
Figure 8D:
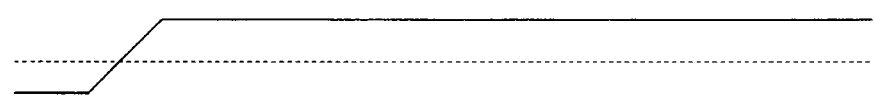
FIG. 8D is an example of an operational waveform of a part in the contactless electronic device shown in FIG. 6.
Figure 8E:
FIG. 8E is an example of an operational waveform of a part in the contactless electronic device shown in FIG. 6.
Figure 8F:
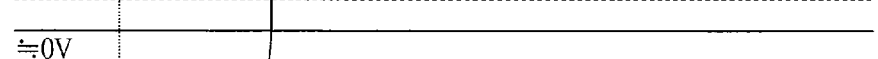
FIG. 8F is an example of an operational waveform of a part in the contactless electronic device shown in FIG. 6.
Figure 8G:
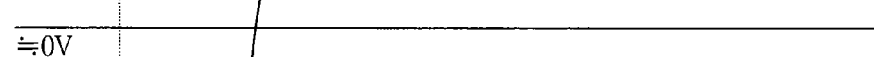
FIG. 8G is an example of an operational waveform of a part in the contactless electronic device shown in FIG. 6.

Each of the FIG. 8A to FIG. 8I shows an example of an operational waveform in the case where the antenna coil L1 receives the high-frequency signal from the reader/writer device. FIG. 8A shows a high-frequency signal generated on both ends of the antenna coil L1, FIG. 8B shows a high-frequency signal generated on both ends of the antenna A1, FIG. 8C shows an output signal of the rectification unit provided to the wave detection circuit B15b, FIG. 8D shows an output signal of the filter circuit provided to the wave detection circuit B15b, FIG. 8E shows the output signal S4 of the wave detection circuit B15b, FIG. 8F shows an output signal of the rectification circuit provided to the wave detection circuit B15a, FIG. 8G shows an output signal of the filter circuit provided to the wave detection circuit B15a, FIG. 8H shows the output signal S3 of the wave detection circuit B15a, and FIG. 8I shows the output signal S2 of the interface judgment circuit B5, respectively.

Each of the FIG. 9A to FIG. 9I shows an example of an operational waveform in the case where the antenna A1 receives the high-frequency signals from the reader/writer device. FIG. 9A shows a high-frequency signal generated on both ends of the antenna coil L1, FIG. 9B shows a high-frequency signal generated on both ends of the antenna A1, FIG. 9C shows an output signal of the rectification unit provided to the wave detection circuit B15b, FIG. 9D shows an output signal of the filter circuit provided to the wave detection circuit B15b, FIG. 9E shows the output signal S4 of the wave detection circuit B15b, FIG. 9F shows an output signal of the rectification circuit provided to the wave detection circuit B15a, FIG. 9G shows an output signal of the filter circuit provided to the wave detection circuit B15a, FIG. 9H shows the output signal S3 of the wave detection circuit B15a, and FIG. 9I shows the output signal S2 of the interface judgment circuit B5, respectively.

The wave detection circuit B15 comprises a rectification unit B16, a filter circuit B17, and a binarization circuit B18. The rectification unit rectifies/smoothes the high-frequency signal supplied between the antenna terminals by the antenna A1 or the antenna coil L1, the filter circuit B17 removes an unnecessary frequency component, and the binarization circuit B18 binarizes the signal.

The rectification unit B16 typically comprises a diode, a resistance, a capacitor and the like, and rectifies and smoothes high-frequency signals supplied between the antenna terminals. The filter circuit B17 typically comprises a low-pass filter. Further, frequency characteristics of the filter circuit B17 are set to remove a high-frequency component what the output signal of the rectification unit B16 has. The binarization circuit B18 compares an output signal of the filter circuit B17 and a predetermined voltage and outputs "0" or "1" according to the magnitude relation of the comparison. In this manner, the output signal of the filter circuit B17 is binarized and the binarized signal is supplied to the interface judgment circuit B5. Note that, if the power supply circuits B2a and B2b have parts having same functions as the rectification unit B16 and the filter circuit B17 inside, the parts may be used for the rectification unit B16 and the filter circuit B17.

In the case where the high-frequency signals supplied from the reader/writer device are received by the antenna coil L1, as shown in FIGS. 8A to 8I, the high-frequency signal generated at both ends of the antenna coil L1 is rectified by the rectification unit B16 and a high-frequency component thereof is removed by passing through the filter circuit B17. The binarization circuit binarizes the output signal of the filter circuit B17, thereby obtaining an output of "H" as the output signal S4. At this time, since the antenna A1 does not receive the high-frequency signal, the output signal of the filter circuit B17 has the ground potential, thereby obtaining an output of "L" as the output signal S3 of the binarization circuit B18. According to the outputs, the interface judgment circuit B5 judges that the antenna coil L1 supplies the high-frequency signal (Mode1).

On the other hand, in the case where the antenna A1 receives the high-frequency signal supplied from the reader/writer device, as shown in FIGS. 9A to 9I, the high-frequency signal generated on both ends of the antenna A1 is rectified by the rectification unit B16 and a high-frequency component thereof is removed by passing through the filter circuit B17. The binarization circuit binarizes the output signal of the filter circuit B17, thereby obtaining an output of "H" as the output signal S3. At this time, since the antenna coil L1 does not receive the high-frequency signal, the output signal of the filter circuit B17 has the ground potential, thereby obtaining an output of "L" as the output signal S4 of the binarization circuit B18. According to the outputs, the interface judgment circuit B5 judges that the antenna A1 supplies the high-frequency signal (Mode2).

According to the configuration and operations described above, it becomes possible to specify the antenna receiving the high-frequency signal, and also, it becomes possible to select a clock signal compliant to the bandwidth of the high-frequency signal and a transceiver circuit by using the output signal of the interface judgment circuit B5. Further, since the wave detection circuit B15a and the wave detection circuit B15b have, also in the case where high-frequency signals are inputted, not too many changing points of signals inputted to the binarization circuit B18 provided to the wave detection circuits B15, it becomes possible to reduce power consumption of mainly the binarization circuit B18 provided to the wave detection circuits B15.

Fourth Embodiment

Figure 10:
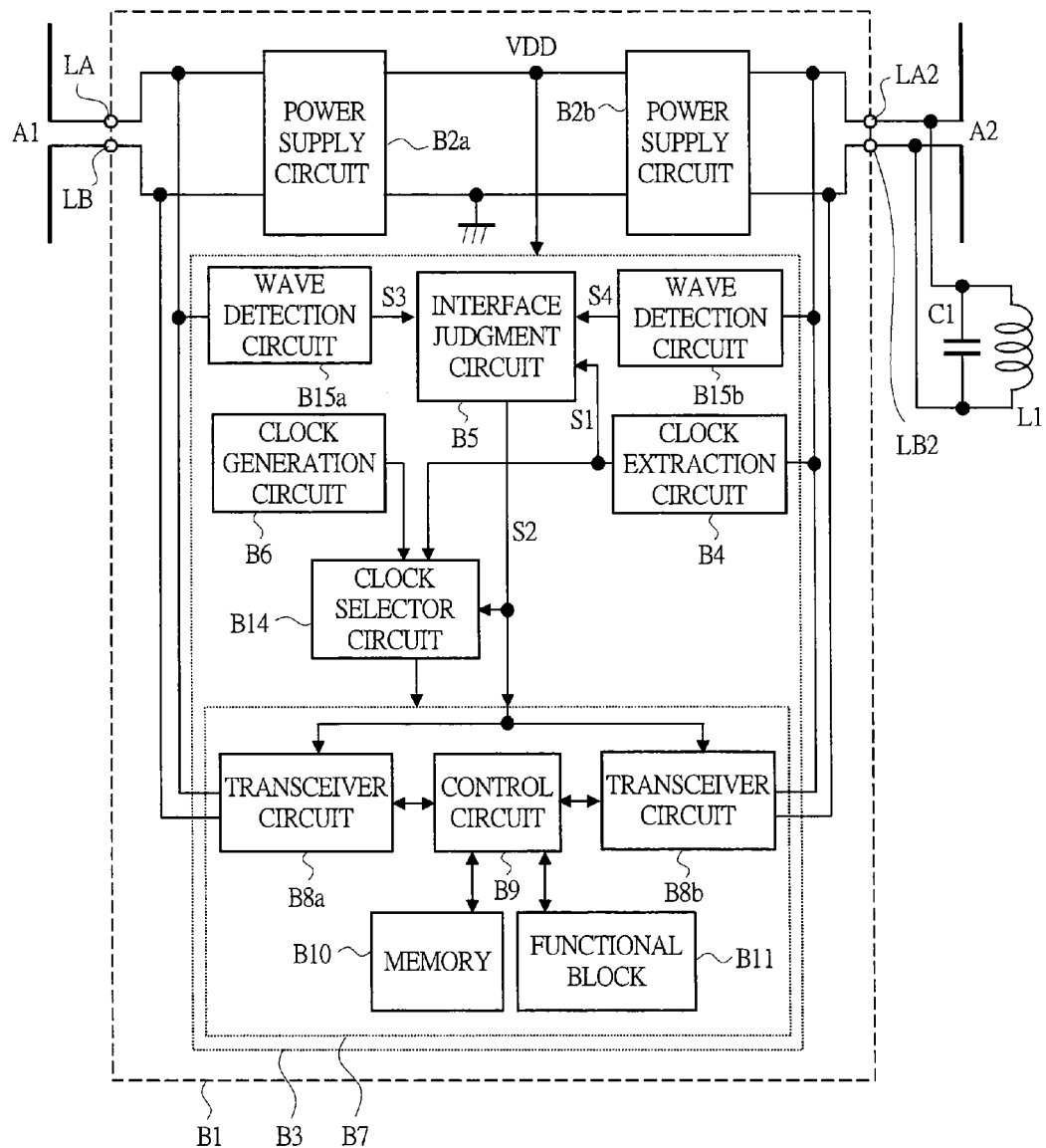
FIG. 10 is a contactless electronic device according to a fourth embodiment of the present invention.

FIG. 10 shows a basic configuration of a contactless electronic device according to a fourth embodiment of the present invention. The fourth embodiment shown in FIG. 10 comprises two sets of connection terminals for connecting the antenna and the antenna coil, and the antenna A1 is connected to one of the antenna connection terminals, and an antenna A2 and the antenna L1 are connected to the other connection terminal. And further, as well as the wave detection circuit detects high-frequency signals generated between the antenna terminals, the clock extraction circuit detects whether high-frequency signals are supplied from the antenna coil L1.

In FIG. 10, B1 is the semiconductor integrated circuit device mounted in the contactless electronic device, A1 and A2 are the antennas mounted in the contactless electronic device, and L1 and C1 are the antenna coil and the resonance capacitor mounted in the contactless electronic device. The semiconductor integrated circuit device B1 comprises: the power supply circuits B2a and B2b; the internal circuit B3; the antenna terminals LA and LB for connecting the antenna A1; and the antenna terminals LA2 and LB2 for connecting the antenna A2 and the antenna coil L1. In FIG. 10, while two sets of antenna terminals are provided, for example, in the case where the antenna terminals LB and LB2 are used for the ground potential in the semiconductor integrated circuit device B1, the antenna terminal LB2 may be removed and one terminal of the antenna coil L1 may be connected to the antenna terminal LB. Further, similar to the first embodiment, the resonance capacitor C1 may be mounted in the semiconductor integrated circuit device B1.

The antenna A1 receives the high-frequency signal supplied from the reader/writer device and supplies the high-frequency AC signal to the antenna terminals LA and LB, and the antenna A2 receives the high-frequency signal supplied from the reader/writer device and supplies the high-frequency signal to the antenna terminals LA2 and LB2. The antenna coil L1 receives the high-frequency signal supplied from the reader/writer device and supplies the high-frequency AC signal to the antenna terminals LA2 and LB2. The AC signal is partially modulated by an information signal (data). Typically, the antennas A1 and A2 are antennas capable of receiving high-frequency signals of UHF band and 2.45 GHz band to which a high-frequency signal is supplied in a form of radio waves from the reader/writer device. And, typically, the antenna coil L1 is an antenna coil capable of receiving the high-frequency signal of 13.56 MHz band, to which high-frequency signals are supplied in a form of electromagnetic waves from the reader/writer device.

For example, when an antenna for receiving high-frequency signals of UHF band is used as the antenna A1 and an antenna for receiving the high-frequency signal of 2.45 GHz band is used as the antenna A2, in combination with the high-frequency signal of 13.56 MHz band what the antenna coil L1 receives, it becomes possible to receive high-frequency signals of three bandwidths. Further, since the connection terminals of the antenna A1 and the connection terminals of the antenna A2 and the antenna coil L1 are separated, the power supply circuits B2a and B2b are provided to the respective antenna terminals. At this time, output voltages from the two power supply circuits B2 are supplied to the internal circuit B3 as the supply voltage VDD.

The power supply circuits B2a and B2b comprise, although not illustrated, a rectification circuit and a smoothing capacitor generally used. The rectification circuit rectifies the AC signal received by the antenna A1 and the antenna coil L1 provided to the contactless electronic device, and the smoothing capacitor smoothes output signals from the rectification circuit, thereby obtaining the supply voltage VDD to be supplied to the internal circuit B3. Further, the smoothing capacitor provided to the power supply circuits B2a and B2b may be shared, and a regulator circuit for controlling the supply voltage VDD not to exceed a predetermined voltage may be provided.

The internal circuit B3 comprises: the wave detection circuits B15a and B15b; the clock extraction circuit B4; the interface judgment circuit B5; the clock generation circuit B6; the clock selector circuit B14; and the signal processing circuit B7. The wave detection circuit B15a binarizes the existence of a high-frequency signal received by the antenna A1 provided to the contactless electronic device, thereby detecting whether the antenna A1 supplies the high-frequency signal, and the wave detection circuit B15b binarizes the existence of a high-frequency signal received by the antenna A2 or the antenna coil L1 provided to the contactless electronic device, thereby detecting whether the antenna A2 or the antenna coil L1 supplies high-frequency signals. The clock extraction circuit B4 binarizes the high-frequency signal received by the antenna coil L1 provided to the contactless electronic device, thereby generating a clock signal having a same cycle as the high-frequency signal and outputs it as the output signal S1.

The interface judgment circuit B5 receives the output signal S3 of the wave detection circuit B15a, the output signal S4 of the wave detection circuit B15b and the output signal S1 of the clock extraction circuit B4, and judges which of the antennas A1 and A2 and further the antenna coil L1 receives the high-frequency signal supplied from the reader/writer device. For example, in the case where the antenna A1 supplies the high-frequency signal, the judgment is made by the output signal S3 of the wave detection circuit B15a, and in the case where the antenna A2 and the antenna coil L1 supply high-frequency signals, the judgment is made by the output signal S4 of the wave detection circuit B15b. Further, as described in the first embodiment, depending on whether the clock extraction circuit B14 can extract a clock signal or not from the high-frequency signal supplied from the antenna A2 and the antenna coil L1, which one of the antenna A2 and the antenna coil L1 receives high-frequency signals is judged.

The interface judgment circuit B5 supplies these judgment results as the output signal S2 to the signal processing circuit B7 and the clock selector circuit B14. Note that, in the fourth embodiment, since three antennas or antenna coils are connected, the interface judgment circuit B5 uses signal lines capable of representing the three states, thereby outputting the output signal S2.

According to the output signal S2 of the interface judgment circuit B5, the clock selector circuit B14 supplies clock signals outputted by the clock generation circuit B6 to the signal processing circuit B7 in the case where the high-frequency signal supplied from the reader/writer device is received by the antenna A1 or A2, and the clock selector circuit B14 supplies a clock signal generated by the clock extraction circuit B4 to the signal processing circuit B7 in the case where the high-frequency signal supplied from the reader/writer device is received by the antenna coil L1. At this time, the clock selector circuit B14 may have a function of changing the frequency of the clock signal to be compatible for communication protocols and the like by not only selecting a clock signal outputted by the clock extraction circuit B4 and the clock generation circuit B6, but also dividing the frequency of the clock signal.

The signal processing circuit B7 comprises: two transceiver circuits B8a and B8b; the control circuit B9; the memory B10; and the functional block B11. The transceiver circuit B8a has: a function of demodulating an information signal to be superimposed to the AC signal being received by the antenna A1 provided to the contactless electronic device and supplying the same as a digital information signal to the control circuit B9; and a function of receiving the information signal of digital signal outputted from the control circuit B9 and modulating the AC signal being received by the antenna A1 by the same information signal. The transceiver circuit B8b has: a function of demodulating an information signal to be superimposed to the AC signal being received by the antenna A1 or the antenna coil L1 provided to the contactless electronic device and supplying the same as a digital information signal to the control circuit B9; and a function of receiving the information signal of digital signal outputted from the control circuit B9 and modulating the AC signal received by the antenna A1 or the antenna coil L1 by the same information signal.

The memory B10 is used for, for example, storing information data between the control circuit B9, and the control circuit B9 performs reading, writing, and deleting of data. The functional block 11 has, although not limited to this, a specific calculation function such as data encryption function, and the control circuit B9 controls the operation of the functional block 11. Meanwhile, the functional block 11 may not be mounted. Further, according to the output signal S2 of the interface judgment circuit B5, in the case where the high-frequency signal supplied from the reader/writer device is received by the antenna A1, the signal processing circuit B7 allows the transceiver circuit B8a to operate and makes the transceiver circuit B8b paused, and in the case where the high-frequency signal supplied from the reader/writer device is received by the antenna coil L1, the signal processing circuit B7 makes the transceiver circuit B8a paused and allows the transceiver circuit B8b to operate.

According to the configuration and operations described above, by providing two sets of antenna terminals to the semiconductor integrated circuit B1, it becomes possible to connect antennas compliant to high-frequency signals of three bandwidths. Further, it becomes possible to specify the antenna receiving the high-frequency signals, and also, it becomes possible to select a clock signal compliant to the bandwidth of the receiving high-frequency signal and a transceiver circuit by using the output signal of the interface judgment circuit B5. Accordingly, it is possible to select a frequency of clock signal most compatible for the using communication protocol, and further, it becomes possible for an unnecessary transceiver circuit to pause, thereby reducing power consumption.

In the foregoing, the invention made by the inventors of the present invention has been concretely described based on the embodiments. However, it is needless to say that the present invention is not limited to the foregoing embodiments and various modifications and alterations can be made within the scope of the present invention.

For Example, while the clock selection function is not provided in the semiconductor integrated circuit device in the first embodiment, it is also possible to provide the function of selecting a clock signal extracted from the high-frequency signal of 13.56 MHz and a clock signal outputted from the clock generation circuit like the second embodiment. And, it is possible to change the antenna coil L1 in the third embodiment to the antenna A2. Further, the power supply circuit, receiver unit, transmitter unit, control unit, and memory provided to the contactless electronic device may be configured by a plurality of semiconductor integrated circuit devices.

Moreover, the present embodiment is not limited to an IC tag, and it is widely applicable to a contactless electronic device capable of realizing data exchanges in forms of radio waves and electromagnetic waves.

The present invention is suitable to be applied to a contactless electronic device, so-called an IC tag and the like.

What is claimed is:

1. A contactless electronic device, the contactless electronic device comprising a semiconductor integrated circuit, a first antenna to receive frequencies of a first frequency band, and a second antenna to receive frequencies of a second frequency band lower than the first frequency band, wherein the semiconductor integrated circuit includes:
   terminals connected to the first and second antennas, a power supply circuit, an interface judgment circuit, a clock circuit, a data transceiver circuit, a signal processing circuit, a filter circuit to extract a high-frequency signal of a predetermined frequency range from a received high-frequency signal from one of the first and second antennas, and a binarization circuit to perform a binary judgment of an output of the filter circuit,
   wherein the interface judgment circuit judges if the received high-frequency signal is a high-frequency signal of a predetermined frequency range based on an output of the binarization circuit, and thus judges through which of the first and second antennas the received high-frequency signal is input, and
   wherein the semiconductor integrated circuit is operative such that a state of operation is changed based on an output signal of the interface judgment circuit.

2. The contactless electronic device according to claim 1, wherein the filter circuit passes frequencies of the second frequency band and blocks frequencies of the first frequency band.

3. The contactless electronic device according to claim 1, wherein the clock circuit generates operational clocks of internal circuits of the semiconductor integrated circuit, including the data transceiver circuit, and wherein the operational clocks having frequencies which are different based on the output signal of the interface judgment circuit are supplied to the internal circuits.

4. The contactless electronic device according to claim 1, wherein the signal processing circuit has:
   a control function to control the state of operation of the semiconductor integrated circuit;
   a calculation function to execute specific calculation processing; and a memory unit to store information, wherein the calculation function is controlled to be an operational state or a non-operational state based on the output signal of the interface judgment circuit.

5. The contactless electronic device according to claim 1, wherein the signal processing circuit has:

a control function to control the state of operation of the semiconductor integrated circuit;

a calculation function to execute a specific calculation processing; and a memory unit to store information, wherein access availability of the memory unit is controlled based on the output signal of the interface judgment circuit.

* * * * *